US012605939B2

(12) United States Patent
Hosokawa et al.

(10) Patent No.: US 12,605,939 B2
(45) Date of Patent: Apr. 21, 2026

(54) LIQUID EJECTING APPARATUS AND LIQUID STORAGE APPARATUS

(71) Applicant: SEIKO EPSON CORPORATION, Tokyo (JP)

(72) Inventors: Yasuhiro Hosokawa, Shiojiri (JP); Masahiko Yoshida, Shiojiri (JP); Junpei Yoshida, Matsumoto (JP); Tadashi Ishikawa, Shiojiri (JP); Takanori Yokoi, Yamagata-mura (JP); Toru Matsuyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 18/586,641

(22) Filed: Feb. 26, 2024

(65) Prior Publication Data

US 2024/0286414 A1 Aug. 29, 2024

(30) Foreign Application Priority Data

Feb. 27, 2023 (JP) ................................ 2023-028917

(51) Int. Cl.
*B41J 2/175* (2006.01)

(52) U.S. Cl.
CPC ....... *B41J 2/17566* (2013.01); *B41J 2/17513* (2013.01); *B41J 2002/17579* (2013.01)

(58) Field of Classification Search
CPC ................ B41J 2/17513; B41J 2/17566; B41J 2002/17579; B41J 29/38; B41J 29/393; B41J 2/1753; B41J 2/17523
USPC ................................ 347/6, 7, 19, 50, 85, 86
See application file for complete search history.

(56) References Cited

U.S. PATENT DOCUMENTS

2016/0271941 A1* 9/2016 Yokoyama ............... B41J 2/175

FOREIGN PATENT DOCUMENTS

JP H06-270410 A 9/1994

* cited by examiner

*Primary Examiner* — Jannelle M Lebron
(74) *Attorney, Agent, or Firm* — Spencer Fane LLP

(57) ABSTRACT

A liquid ejecting apparatus includes: a container that contains a liquid having conductivity; an electrode bar that is disposed inside the container and that includes a first terminal, a second terminal, and a first insulating section that electrically insulates the first terminal from the second terminal; a detection section that detects a remaining amount of liquid contained in the container in accordance with an electrical signal from at least one of the first terminal and the second terminal; and a liquid ejection head that discharges the liquid supplied from the container. The remaining amount of liquid detected by the detection section when the first terminal is electrically coupled to the second terminal via the liquid in the container is larger than the remaining amount of liquid detected by the detection section when the first terminal is not electrically coupled to the second terminal via the liquid in the container.

8 Claims, 7 Drawing Sheets

LIQUID EJECTING APPARATUS AND LIQUID STORAGE APPARATUS

The present application is based on, and claims priority from JP Application Serial Number 2023-028917, filed Feb. 27, 2023, the disclosure of which is hereby incorporated by reference herein in its entirety.

BACKGROUND

1. Technical Field

The present disclosure relates to liquid ejecting apparatuses and liquid storage apparatuses.

2. Related Art

Various techniques have been proposed for detecting the remaining amount of conductive liquid, such as ink, contained in a container. As an example of such techniques, JP-A-6-270410 proposes a liquid storage apparatus in which a detection section detects the remaining amount of liquid contained in a container, based on a resistance value between two rod-shaped electrode pins arranged inside the container.

The above technique disadvantageously involves installing two electrode pins inside a container. It accordingly may be difficult to manufacture the liquid storage apparatus with a little time and effort.

SUMMARY

According to a first aspect of the present disclosure, a liquid ejecting apparatus includes: a container that contains a liquid having conductivity; an electrode bar disposed inside the container, the electrode bar including a first terminal, a second terminal, and a first insulating section that electrically insulates the first terminal from the second terminal; a detection section that detects a remaining amount of liquid contained in the container in accordance with an electrical signal from at least one of the first terminal and the second terminal; and a liquid ejection head that discharges the liquid supplied from the container. The remaining amount of liquid detected by the detection section when the first terminal is electrically coupled to the second terminal via the liquid in the container is larger than the remaining amount of liquid detected by the detection section when the first terminal is not electrically coupled to the second terminal via the liquid in the container.

According to a second aspect of the present disclosure, a liquid storage apparatus includes: a container that contains a liquid having conductivity; an electrode bar disposed inside the container, the electrode bar including a first terminal, a second terminal, and a first insulating section that electrically insulates the first terminal from the second terminal; and a detection section that detects a remaining amount of liquid contained in the container in accordance with an electrical signal from at least one of the first terminal and the second terminal. The remaining amount of liquid detected by the detection section when the first terminal is electrically coupled to the second terminal via the liquid in the container is larger than the remaining amount of liquid detected by the detection section when the first terminal is not electrically coupled to the second terminal via the liquid in the container.

DESCRIPTION OF EMBODIMENTS

Some embodiments of the present disclosure will be described below with reference to the accompanying drawings. It should be noted that the dimensions and scales of components in each drawing are not necessarily identical to the actual ones. Although the embodiments described below have various technically preferable limitations, they are simply concrete examples of the present disclosure and not intended to narrow the scope of the present disclosure unless otherwise stated herein.

A. Embodiment

An ink jet printer 100 according to an embodiment of the present disclosure will be described below.

A-1. Outline of Ink Jet Printer

Figure 1:
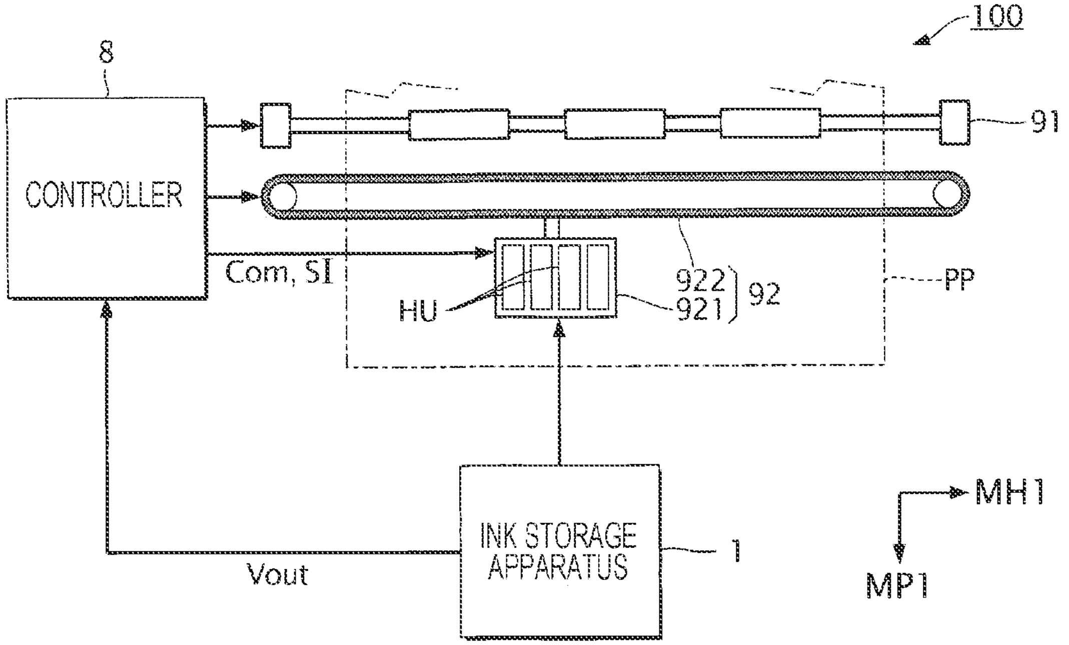
FIG. 1 is a configuration diagram of an ink jet printer according to an embodiment of the present disclosure.

FIG. 1 is a configuration diagram of the ink jet printer 100 according to this embodiment.

The ink jet printer 100 may be a print apparatus that discharges ink IK onto a medium PP; the medium PP may be made of paper, resin, fabric, or any other material. In this embodiment, the ink IK is conductive ink. In the embodiment, the ink jet printer 100 corresponds to an example of a liquid ejecting apparatus, whereas the ink IK corresponds to an example of a liquid having conductivity.

As illustrated in FIG. 1, the ink jet printer 100 includes an ink storage apparatus 1, a controller 8, a plurality of liquid ejection heads HU, a transport mechanism 91, and a movement mechanism 92.

The controller 8, which includes a processing circuit and a memory circuit, controls the operations of individual components constituting the ink jet printer 100. The processing circuit may be a central processing unit (CPU) or a field programmable gate array (FPGA); the memory circuit may be a semiconductor memory.

The transport mechanism 91 transports the medium PP in a sub-scanning direction MP1 under the control of the controller 8.

The movement mechanism 92 moves the plurality of liquid ejection heads HU in a main-scanning direction MH1 and a main-scanning direction MH2 under the control of the controller 8. The main-scanning directions MH1 and MH2 each intersect the sub-scanning direction MP1 and are opposite to each other. The movement mechanism 92 includes: a casing 921 in which the plurality of liquid ejection heads HU are mounted side by side; and an endless belt 922 to which the casing 921 is fixed. In addition to the liquid ejection heads HU, the ink storage apparatus 1 is optionally mounted in the casing 921.

The controller 8 supplies each liquid ejection head HU with a drive signal Com for use in driving each liquid ejection head HU and a control signal SI for use in controlling the operation of each liquid ejection head HU.

Each liquid ejection head HU is driven under the control responsive to the control signal SI and in accordance with the drive signal Com and discharges the ink IK through some or all nozzles arrayed therein. More specifically, each liquid ejection head HU discharges droplets of the ink IK onto the medium PP through some or all of the nozzles in cooperation with both the transport of the medium PP with the transport mechanism 91 and the reciprocation of the liquid ejection heads HU with the movement mechanism 92. The discharged ink IK droplets then land over the surface of the medium PP, thereby creating a desired image thereon.

The ink storage apparatus 1 contains the ink IK. The ink storage apparatus 1 then supplies the ink IK contained in the ink storage apparatus 1 to each liquid ejection head HU under the control of the controller 8. In this embodiment, the ink storage apparatus 1 corresponds to an example of a liquid storage apparatus.

In this embodiment, the ink storage apparatus 1 contains an M number of types of ink IK, where M is a natural number equal to or more than 1. In this embodiment, as an example, the ink storage apparatus 1 contains four types of ink IK, more specifically, cyan ink, magenta ink, yellow ink, and black ink. In this embodiment, as an example, M is set to 4.

In this embodiment, the ink jet printer 100 has an M number of liquid ejection heads HU in relation to an M number of types of ink IK. More specifically, in the embodiment, as an example, the ink jet printer 100 has four liquid ejection heads HU in relation to the four types of ink IK. Hereinafter, of an M number of liquid ejection heads HU, the m-th one is sometimes referred to as the liquid ejection head HU[m], where m is a variable consisting of a natural number in the range of 1 to M.

The ink storage apparatus 1 includes one or more ink amount detection circuits 2 that detect the remaining amounts of ink IK contained in the ink storage apparatus 1 and then output detection signals Vout indicating the detection results. Details of the or each ink amount detection circuit 2 will be described later with reference to FIG. 3.

A-2. Ink Storage Apparatus

The outline of the ink storage apparatus 1 will be described below with reference to FIGS. 2 to 5.

Figure 2:
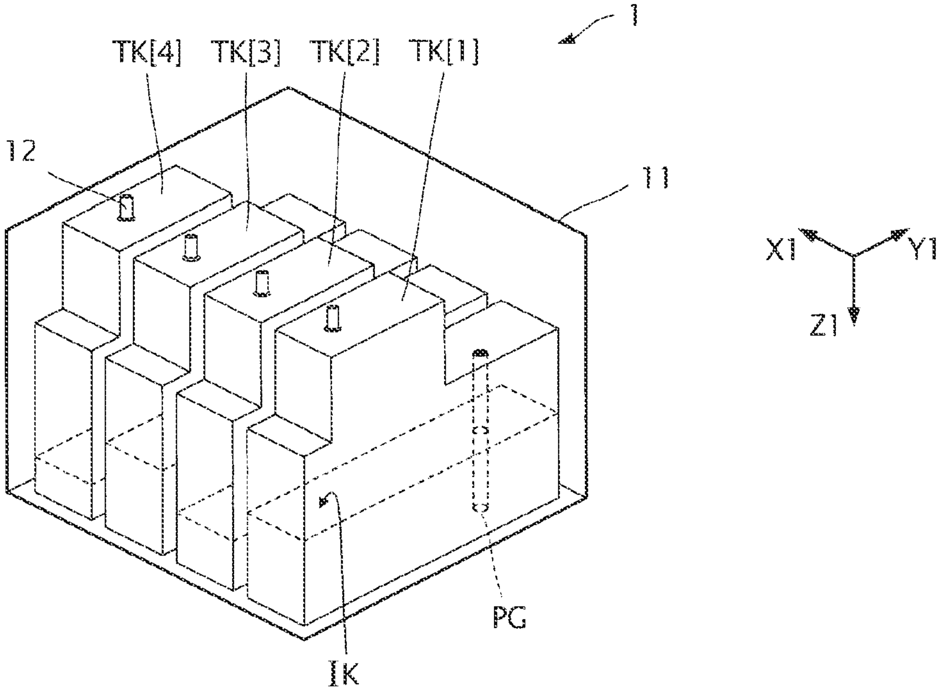
FIG. 2 is a perspective view of the ink storage apparatus in the ink jet printer.

FIG. 2 is a perspective view of the ink storage apparatus 1.

As illustrated in FIG. 2, the ink storage apparatus 1 further includes: an M number of ink tanks, or ink tanks TK[1] to TK[M], related on a one-to-one basis to an M number of types of ink IK contained in the ink storage apparatus 1; and a casing 11 that accommodates the ink tanks TK[1] to TK[M]. More specifically, in this embodiment, the ink storage apparatus 1 includes the four ink tanks TK[1] to TK[4] related on a one-to-one basis to the four types of ink, or the cyan ink, magenta ink, yellow ink, and black ink.

The ink tank TK[m] contains the ink IK of the type related thereto and supplies the ink IK to the liquid ejection head HU[m]. The ink tank TK[m] has a supply port 12 via which the ink IK is to be supplied to the inner space of the ink tank TK[m]. In this embodiment, the ink tank TK[m] corresponds to an example of a container.

The ink tank TK[m] accommodates an electrode bar PG, which is a rod-shaped electrode. In this embodiment, the electrode bar PG may be a phone plug, which is a male one of a pair of connectors via which an electrical signal is to be input to or output from electronic equipment such as audio equipment. In this case, the electrode bar PG may be a given phone plug such as a commercial one.

Hereinafter, the direction in which the liquid surface of the ink IK contained in the ink tank TK[m] moves with the supply of the ink IK from the ink tank TK[m] to the liquid ejection head HU[m] is defined as a direction Z1. In this embodiment, as an example, the electrode bar PG extends in the direction Z1.

Hereinafter, the direction Z1 along the Z-axis and a direction Z2 opposite to the direction Z1 are sometimes collectively referred to as Z-axial directions. Hereinafter, a direction X1 along the X-axis intersecting the Z-axis and a direction X2 opposite to the direction X1 are sometimes collectively referred to as X-axial directions. Hereinafter, a direction Y1 along the Y-axis intersecting the X-axis and a direction Y2 opposite to the direction Y1 are sometimes collectively referred to as Y-axial directions. In this embodiment, the X-, Y-, and Z-axes are orthogonal to one another. However, the present disclosure is not limited to such aspects; alternatively, the X-, Y-, and Z-axes may intersect one another at any angle.

Figure 3:
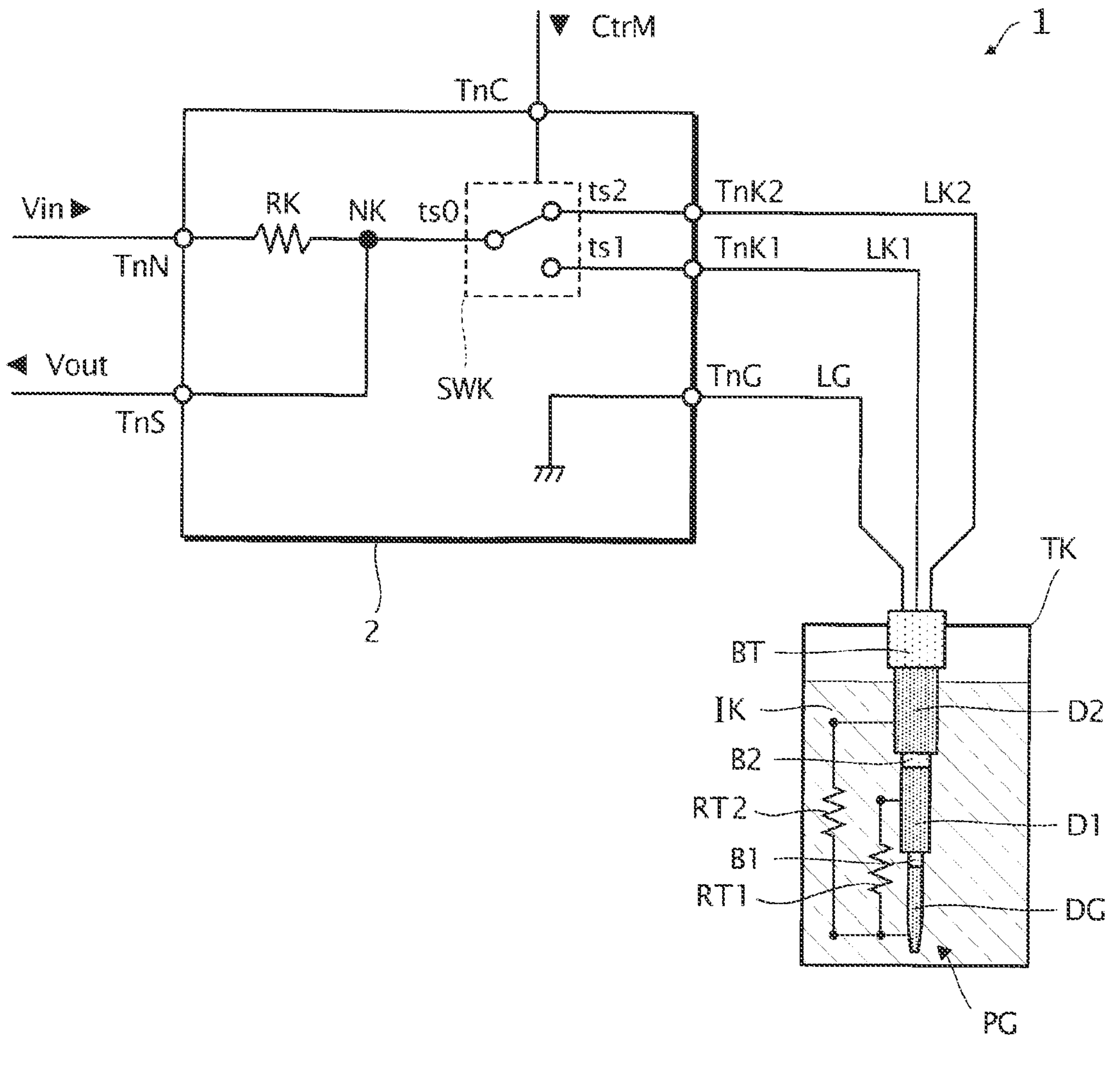
FIG. 3 is a circuit diagram of the ink storage apparatus.

FIG. 3 is a circuit diagram of the ink storage apparatus 1. In this embodiment, the ink storage apparatus 1 includes: an M number of ink tanks TK[1] to TK[M]; and an M number of ink amount detection circuits 2 related on a one-to-one basis to the ink tanks TK[1] to TK[M]. It should be noted that FIG. 3 illustrates only one of the ink tanks TK[1] to TK[M] and a related one of the ink amount detection circuits 2. Herein, the ink amount detection circuit 2 corresponds to an example of a detection section.

As illustrated in FIG. 3, the ink tank TK[m] accommodates the electrode bar PG.

The electrode bar PG includes: a reference terminal DG that has conductivity; a detection terminal D1 that has conductivity; a detection terminal D2 that has conductivity; an insulating portion B1 that has insulation and electrically insulates the reference terminal DG from the detection terminal D1; an insulating portion B2 that has insulation and electrically insulates the detection terminal D1 from the detection terminal D2; and a connecting portion BT that has insulation. The reference terminal DG is electrically coupled to a wire LG; the detection terminal D1 is electrically coupled to a wire LK1; and the detection terminal D2 is electrically coupled to a wire LK2.

The ink amount detection circuit 2 includes an input terminal TnN, a detection terminal TnK1, a detection terminal TnK2, a reference potential connection terminal TnG, an output terminal TnS, a control terminal TnC, a switch SWK, a resistance RK, and a node NK.

The ink amount detection circuit 2 receives, via the input terminal TnN, an input signal Vin that has been set to a constant input potential V0. The detection terminal TnK1 is electrically coupled to the detection terminal D1 via the wire LK1; the detection terminal TnK2 is electrically coupled to the detection terminal D2 via the wire LK2; and the reference potential connection terminal TnG is electrically coupled to the reference terminal DG via the wire LG and also to the ground via a ground wire. The ink amount detection circuit 2 outputs, via the output terminal TnS, the detection signal Vout that indicates a detection result of the remaining amount of ink IK contained in the ink tank TK[m]. The ink amount detection circuit 2 receives, via the control terminal TnC, a mode designation signal CtrM for use in designating an operation mode of the ink amount detection circuit 2. In this embodiment, as an example, the ink amount detection circuit 2 is configured to operate in two modes: an ink-end detection mode and a near-end detection mode. The mode designation signal CtrM designates in which operation mode, the ink-end detection mode or the near-end detection mode, the ink amount detection circuit 2 operates.

The switch SWK has an input terminal ts1, an input terminal ts2, an output terminal ts0, and a control terminal (not illustrated). The input terminal ts1 is electrically coupled to the detection terminal TnK1; the input terminal ts2 is electrically coupled to the detection terminal TnK2; and the output terminal ts0 is electrically coupled to the node NK. The switch SWK receives the mode designation signal CtrM via the control terminal. When the mode designation signal CtrM received by the switch SWK via the control terminal designates the ink-end detection mode, the switch SWK electrically couples the output terminal ts0 to the input terminal ts1. When the mode designation signal CtrM received by the switch SWK via the control terminal designates the near-end detection mode, the switch SWK electrically couples the output terminal ts0 to the input terminal ts2.

The resistance RK has a first end electrically coupled to the node NK and a second end electrically coupled to the input terminal TnN. The node NK is electrically coupled to the first end of the resistance RK, the output terminal ts0, and the output terminal TnS.

In this embodiment, when the ink IK contained in the ink tank TK[m] is in contact with both the reference terminal DG and the detection terminal D1, the reference terminal DG is electrically coupled to the detection terminal D1 via the ink IK contained in the ink tank TK[m]. Hereinafter, a resistance between the reference terminal DG and the detection terminal D1 when they are in contact with the ink IK contained in the ink tank TK[m] and thus electrically coupled to each other via the ink IK is referred to as an ink resistance RT1. When the detection terminal D1 is not in contact with the ink IK, the resistance between the reference terminal DG and the detection terminal D1 has a very high value. In the embodiment, when the detection terminal D1 is not in contact with the ink IK, the ink resistance RT1 may be regarded as having a very high value.

In this embodiment, when the ink IK contained in the ink tank TK[m] is in contact with both the reference terminal DG and the detection terminal D2, the reference terminal DG is electrically coupled to the detection terminal D2 via the ink IK contained in the ink tank TK[m]. Hereinafter, a resistance between the reference terminal DG and the detection terminal D2 when they are in contact with the ink IK contained in the ink tank TK[m] and thus electrically coupled to each other is referred to as an ink resistance RT2. When the detection terminal D2 is not in contact with the ink IK, the resistance between the reference terminal DG and the detection terminal D2 has a very high value. In the embodiment, when the detection terminal D2 is not in contact with the ink IK, the ink resistance RT2 may be regarded as having a very high value.

When the ink amount detection circuit 2 starts operating in the ink-end detection mode, the switch SWK electrically couples the output terminal ts0 to the input terminal ts1, thereby electrically coupling the node NK to the detection terminal TnK1. When the ink amount detection circuit 2 operates in the ink-end detection mode, the potential at the node NK depends on the relationship of an input potential V0 of the input signal Vin, the resistance value of the ink resistance RT1, and the resistance value of the resistance RK. In this embodiment, each of the input potential V0 of the input signal Vin and the resistance value of the resistance RK has a constant value. Therefore, when the ink amount detection circuit 2 operates in the ink-end detection mode, the potential at the node NK varies depending on the resistance value of the ink resistance RT1. More specifically, in the case where the ink amount detection circuit 2 operates in the ink-end detection mode, the potential at the node NK when the detection terminal D1 is not in contact with the ink IK is higher than that when the detection terminal D1 is in contact with the ink IK. The ink amount detection circuit 2 then outputs, via the output terminal TnS, the detection signal Vout indicating the potential at the node NK.

When the ink amount detection circuit 2 starts operating in the near-end detection mode, the switch SWK electrically couples the output terminal ts0 to the input terminal ts2, thereby electrically coupling the node NK to the detection terminal TnK2. When the ink amount detection circuit 2 operates in the near-end detection mode, the potential at the node NK depends on the relationship of the input potential V0 of the input signal Vin, the resistance value of the ink resistance RT2, and the resistance value of the resistance RK. Therefore, when the ink amount detection circuit 2 operates in the near-end detection mode, the potential at the node NK varies depending on the resistance value of the ink resistance RT2. More specifically, in the case where the ink amount detection circuit 2 operates in the near-end detection mode, the potential at the node NK when the detection terminal D2 is not in contact with the ink IK is higher than that when the detection terminal D2 is in contact with the ink IK. The ink amount detection circuit 2 then outputs, via the output terminal TnS, the detection signal Vout indicating the potential at the node NK.

Figure 4A:
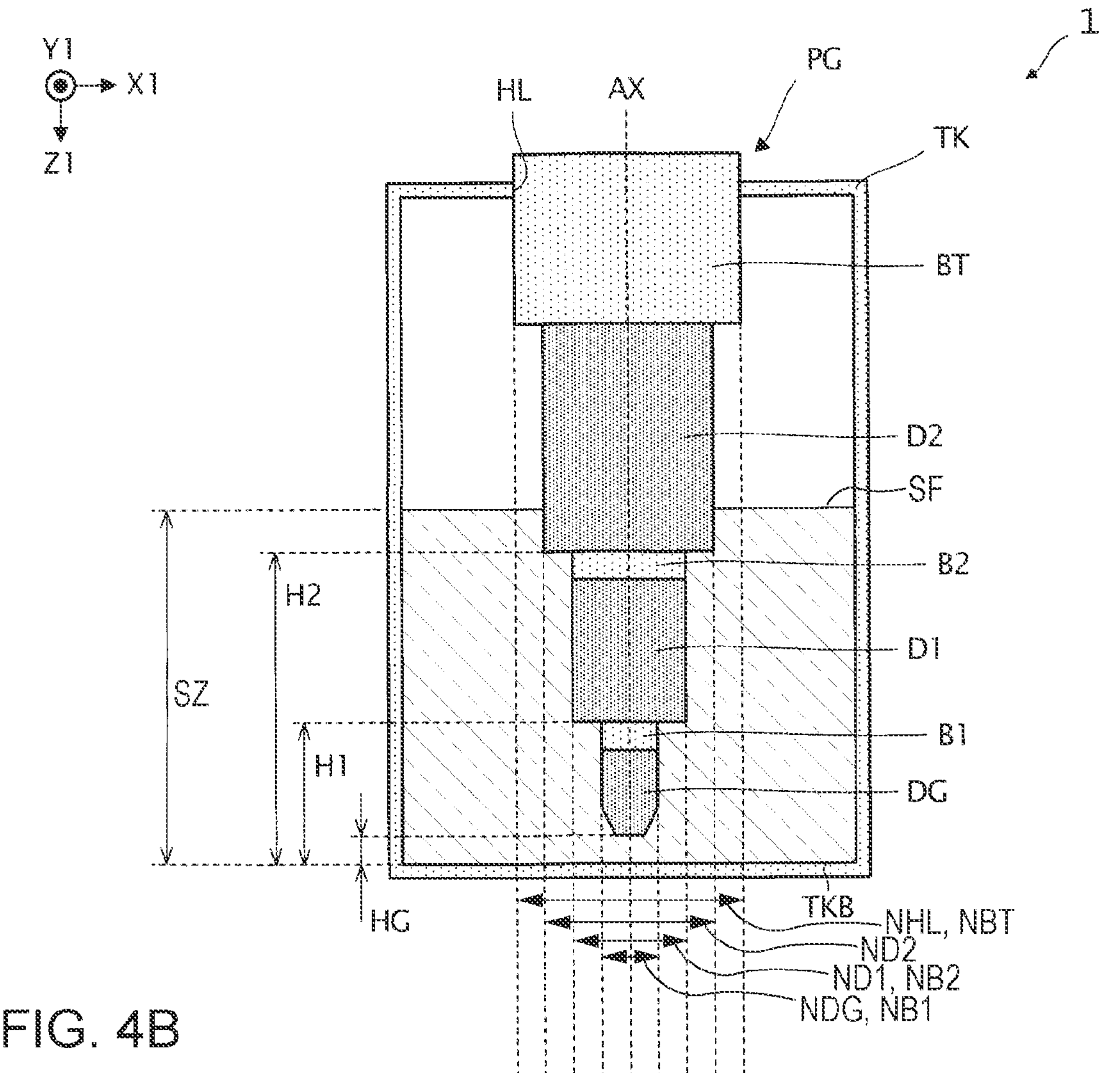
FIG. 4A is a side view of the electrode bar in the ink storage apparatus.
Figure 4B:
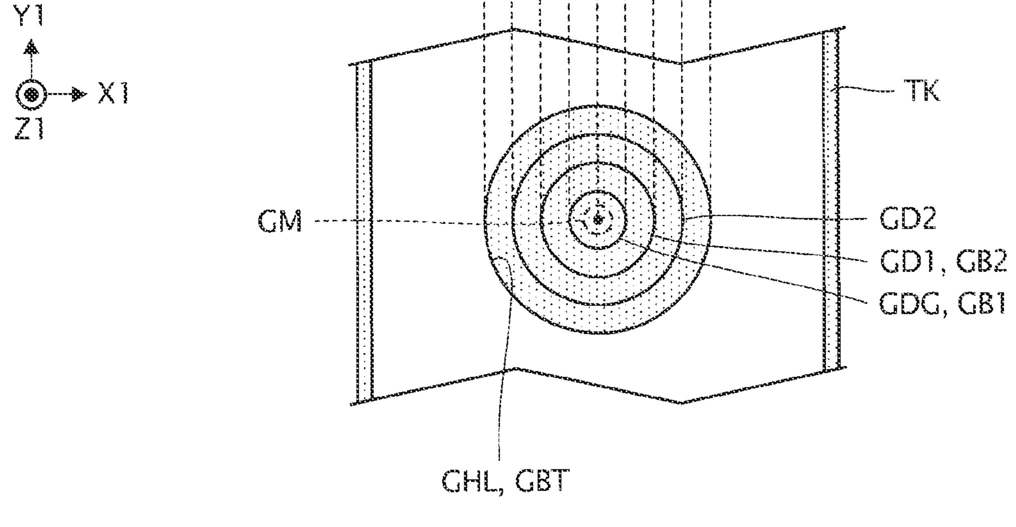
FIG. 4B is a cross-sectional view of the electrode bar.

FIG. 4A is a side view of the electrode bar PG disposed inside the ink tank TK[m]; FIG. 4B is a cross-sectional view of the electrode bar PG taken along the plane normal to a line extending in the direction Z1.

As illustrated in FIG. 4A, as described above, the electrode bar PG is provided with the reference terminal DG having conductivity, the detection terminal D1 having conductivity, the detection terminal D2 having conductivity, the insulating portion B1 having insulation, the insulating portion B2 having insulation, and the connecting portion BT having insulation. In this case, the electrode bar PG extends in the direction Z1.

The reference terminal DG is a cylindrical electrode centered on a central axis AX extending in the direction Z1. As illustrated in FIG. 4B, the reference terminal DG is provided with an outer circumference GDG having a diameter NDG. In this embodiment, the outer circumference GDG may have a circular shape centered on the central axis AX within the plane normal to a line extending in the direction Z1. However, the present disclosure is not limited to such aspects; alternatively, the outer circumference GDG may be defined by any closed curve that surrounds a central area GM within the plane normal to a line extending in the direction Z1. The central area GM is defined as a circular area centered on the central axis AX within the plane normal to a line extending in the direction Z1. For example, the central area GM is an area that has a radius equal to or less than half that of the minimum circle that can surround the outer circumference GDG within the plane normal to a line extending in the direction Z1.

The detection terminal D1 is positioned downstream of the reference terminal DG in the direction Z2. The detection terminal D1 is a cylindrical electrode centered on the central axis AX. As illustrated in FIG. 4B, the detection terminal D1 is provided with an outer circumference GD1 having a diameter ND1. In this embodiment, the outer circumference GD1 may have a circular shape centered on the central axis AX within the plane normal to a line extending in the direction Z1. In the embodiment, the outer circumference GD1 may have a shape and size that surrounds the outer circumference GDG within the plane normal to a line extending in the direction Z1. However, the present disclosure is not limited to such aspects; alternatively, the outer circumference GD1 may be defined by any closed curve that surrounds the central area GM within the plane normal to a line extending in the direction Z1.

The detection terminal D2 is positioned downstream of the detection terminal D1 in the direction Z2. The detection terminal D2 is a cylindrical electrode centered on the central axis AX. As illustrated in FIG. 4B, the detection terminal D2 is provided with an outer circumference GD2 having a diameter ND2. In this embodiment, the outer circumference GD2 may have a circular shape centered on the central axis AX within the plane normal to a line extending in the direction Z1. In the embodiment, the outer circumference GD2 has a shape and size that surrounds the outer circumference GD1 within the plane normal to a line extending in the direction Z1. However, the present disclosure is not limited to such aspects; alternatively, the outer circumference GD2 may be defined by any closed curve that surrounds the central area GM within the plane normal to a line extending in the direction Z1.

The insulating portion B1 is positioned between the reference terminal DG and the detection terminal D1 and electrically insulates the reference terminal DG from the detection terminal D1. In this embodiment, as illustrated in FIG. 4B, the insulating portion B1 is provided with an outer circumference GB1 having a diameter NB1. In the embodiment, more specifically, the outer circumference GB1 has a circular shape centered on the central axis AX within the plane normal to a line extending in the direction Z1. However, the present disclosure is not limited to such aspects; alternatively, the outer circumference GB1 may be defined by any closed curve that surrounds the central area GM within the plane normal to a line extending in the direction Z1.

The insulating portion B2 is positioned between the detection terminals D1 and D2 and electrically insulates the detection terminals D1 and D2 from each other. In this embodiment, as illustrated in FIG. 4B, the insulating portion B2 is provided with an outer circumference GB2 having a diameter NB2. In the embodiment, more specifically, the outer circumference GB2 has a circular shape centered on the central axis AX within the plane normal to a line extending in the direction Z1. However, the present disclosure is not limited to such aspects; alternatively, the outer circumference GB2 may be defined by any closed curve that surrounds the central area GM within the plane normal to a line extending in the direction Z1.

The connecting portion BT is positioned downstream of the detection terminal D2 in the direction Z2. In this embodiment, as illustrated in FIG. 4B, the connecting portion BT is provided with an outer circumference GBT having a diameter NBT. In the embodiment, more specifically, the outer circumference GBT has a circular shape centered on the central axis AX within the plane normal to a line extending in the direction Z1. However, the present disclosure is not limited to such aspects; alternatively, the outer circumference GBT may be defined by any closed curve that surrounds the central area GM within the plane normal to a line extending in the direction Z1.

In this embodiment, the connecting portion BT is bonded to the ink tank TK[m] by applying glue into a mounting hole HL formed in the ink tank TK[m]. The electrode bar PG is thereby fixed to the ink tank TK[m]. In this embodiment, as illustrated in FIG. 4B, an outer circumference GHL has a diameter NHL and is present around the mounting hole HL. In the embodiment, the diameter NHL is substantially the same as the diameter NBT. In addition, the shape of the outer circumference GHL is substantially the same as that of the outer circumference GBT. The description "they are substantially the same" conceptionally implies a case where they are perfectly the same or can be regarded as being the same if a margin is taken into account. More specifically, "they are substantially the same" described herein conceptionally implies a case where they can be regarded as being the same if a margin of about 10% is taken into account. Although the electrode bar PG is fixed to the ink tank TK[m] by applying glue into the mounting hole HL in the embodiment, the electrode bar PG may also be fixed to the ink tank TK[m] by fitting the connecting portion BT into the mounting hole HL. In this case, the diameter NHL may be shorter than the diameter NBT.

Hereinafter, the distance in the Z-axial direction between a bottom TKB of the ink tank TK[m] and a liquid surface SF of the ink IK contained in the ink tank TK[m] is defined as an ink liquid surface distance SZ.

In this embodiment, the electrode bar PG is disposed inside the ink tank TK[m], with the distance in the Z-axial direction between the end of the reference terminal DG on the direction Z1 side and the bottom TKB of the ink tank TK[m] being set to a distance HG. In the embodiment, the electrode bar PG is also disposed inside the ink tank TK[m], with the distance in the Z-axial direction between the end of the detection terminal D1 on the direction Z1 side and the bottom TKB of the ink tank TK[m] being set to a distance H1. In this case, the distance H1 is longer than the distance HG. In the embodiment, the electrode bar PG is also disposed inside the ink tank TK[m], with the distance in the Z-axial direction between the end of the detection terminal D2 on the direction Z1 side and the bottom TKB of the ink tank TK[m] being set to a distance H2. In this case, the distance H2 is longer than the distance H1.

When the ink liquid surface distance SZ is the same as or longer than the distance H1, both the reference terminal DG and the detection terminal D1 are in contact with the ink IK contained in the ink tank TK[m]. In other words, when the ink liquid surface distance SZ is the same as or longer than the distance H1, both the reference terminal DG and the detection terminal D1 are electrically coupled together via the ink resistance RT1 of the ink IK. When the ink liquid surface distance SZ is the same as or longer than the distance H1, if the ink amount detection circuit 2 operates in the ink-end detection mode, the ink amount detection circuit 2 outputs the detection signal Vout having a lower potential than that when the ink liquid surface distance SZ is shorter than the distance H1.

By outputting the detection signal Vout that has been set to a low level during the operation in the ink-end detection mode, the ink amount detection circuit 2 can detect that the remaining amount of the ink IK contained in the ink tank TK[m] is the same as or larger than an ink remaining amount for the distance H1. By outputting the detection signal Vout set to a high level during the operation in the ink-end detection mode, the ink amount detection circuit 2 can detect that the remaining amount of the ink IK contained in the ink tank TK[m] is smaller than the ink remaining amount for the distance H1.

The ink remaining amount for the distance H1 may be the minimum amount of ink IK that can be discharged by the liquid ejection head HU[m]. Alternatively, the ink remaining amount for the distance H1 may be obtained by adding a predetermined amount to the minimum amount of ink IK that can be discharged by the liquid ejection head HU[m]. The predetermined amount may be equated with the amount that is smaller than that required for the ink jet printer 100 to create an image on a single medium PP with the ink IK but enough for the liquid ejection head HU[m] to discharge the ink IK a predetermined number of times. In other words, the ink remaining amount for the distance H1 may be the amount corresponding to that in the state referred to as the "ink end".

When the ink liquid surface distance SZ is the same as or longer than the distance H2, both the reference terminal DG and the detection terminal D2 are in contact with the ink IK contained in the ink tank TK[m]. In other words, when the ink liquid surface distance SZ is the same as or longer than the distance H2, both the reference terminal DG and the detection terminal D2 are electrically coupled together via the ink resistance RT2 of the ink IK. When the ink liquid surface distance SZ is the same as or longer than the distance H2, if the ink amount detection circuit 2 operates in the near-end detection mode, the ink amount detection circuit 2 outputs the detection signal Vout having a lower potential than that when the ink liquid surface distance SZ is shorter than the distance H2.

By outputting the detection signal Vout that has been set to a low level during the operation in the near-end detection mode, the ink amount detection circuit 2 can detect that the amount of the ink IK contained in the ink tank TK[m] is the same as or larger than an ink remaining amount for the distance H2. By outputting the detection signal Vout that has been set to a high level during the operation in the near-end detection mode, the ink amount detection circuit 2 can detect that the remaining amount of the ink IK contained in the ink tank TK[m] is smaller than the ink remaining amount for the distance H2.

The ink remaining amount for the distance H2 may be the amount in which the ink IK can be continuously discharged over a predetermined period by the liquid ejection head HU[m]. In this case, the predetermined period may be long enough for the ink jet printer 100 to create an image on a single medium PP. Alternatively, the predetermined period may be long enough for the ink jet printer 100 to create images on a predetermined number of media PP. In other words, the ink remaining amount for the distance H2 may be the amount corresponding to that in the state referred to as the "near end".

In this embodiment, the controller 8 controls an alarm apparatus (not illustrated) based on the detection signal Vout supplied from the ink storage apparatus 1 in such a way that the alarm apparatus tells the ink remaining amount indicated by the detection signal Vout to the user of the ink jet printer 100 with a sound or an image, for example.

Figure 5:
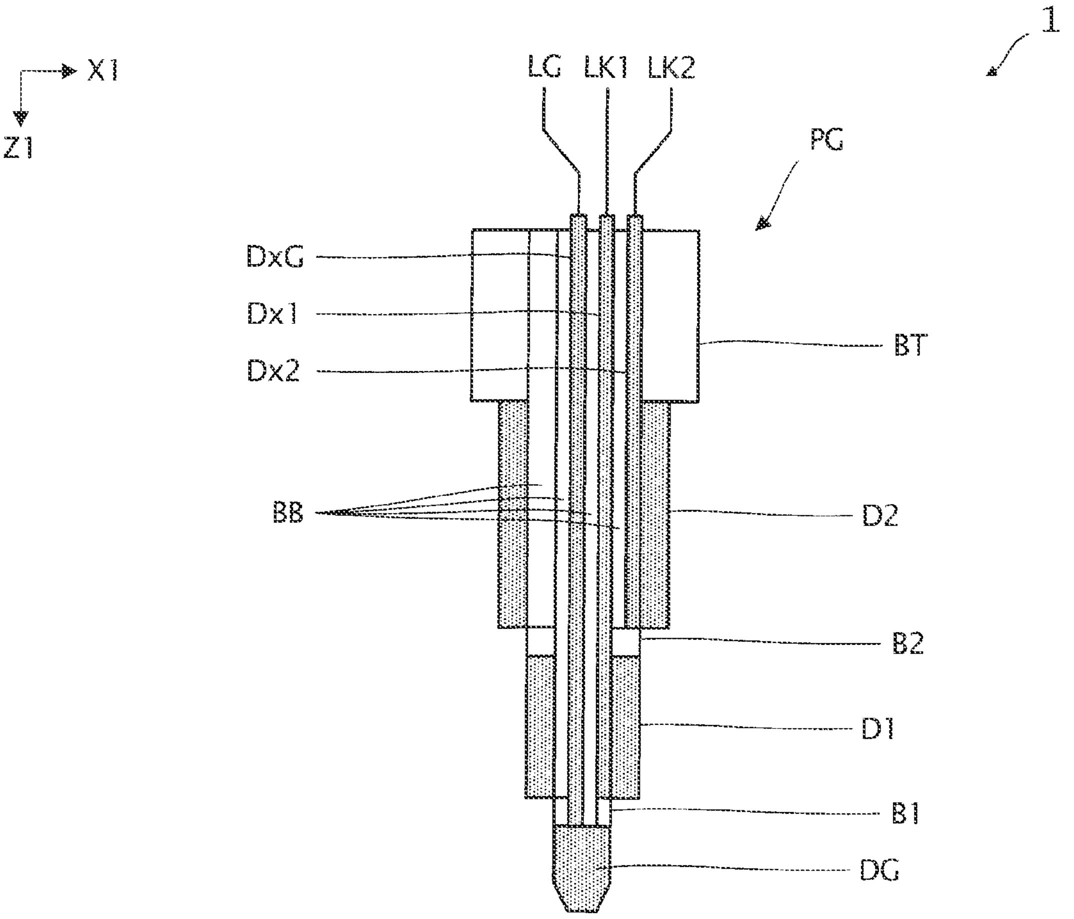
FIG. 5 is a longitudinal cross-sectional view of the electrode bar.

FIG. 5 is a cross-sectional view of the electrode bar PG. More specifically, FIG. 5 illustrates the outline of the cross-section of the electrode bar PG when the electrode bar PG is cut along a plane containing the central axis AX and normal to a line extending in the direction Y1.

As illustrated in FIG. 5, the electrode bar PG includes, in addition to the reference terminal DG, the detection terminals D1 and D2, the insulating portions B1 and B2, and the connecting portion BT described above, a conductive portion DxG having conductivity, a conductive portion Dx1 having conductivity, a conductive portion Dx2 having conductivity, and an insulating portion BB having insulation.

The conductive portion DxG is disposed so as to extend in the direction Z1 while passing through the inner spaces of the insulating portion B1, the detection terminal D1, the insulating portion B2, the detection terminal D2, and the connecting portion BT. The conductive portion DxG is electrically coupled to both the reference terminal DG and the wire LG, thereby providing the continuity between the reference terminal DG and the wire LG. Likewise, the conductive portion Dx1 is disposed so as to extend in the direction Z1 while passing through the inner spaces of the detection terminal D1, the insulating portion B2, the detection terminal D2, and the connecting portion BT. The conductive portion Dx1 is electrically coupled to both the detection terminal D1 and the wire LK1, thereby providing the continuity between the detection terminal D1 and the wire LK1. The conductive portion Dx2 is disposed so as to extend in the direction Z1 while passing through the inner spaces of the detection terminal D2, and the connecting portion BT. The conductive portion Dx2 is electrically coupled to both the detection terminal D2 and the wire LK2, thereby providing the continuity between the detection terminal D2 and the wire LK2. The insulating portion BB electrically insulates the conductive portions DxG, Dx1, and Dx2 from one another.

A-3. Ink Storage Apparatus According to Comparative Example

Next, the outline of an ink storage apparatus 1W according to a comparative example will be described below with reference to FIG. 6.

Figure 6:
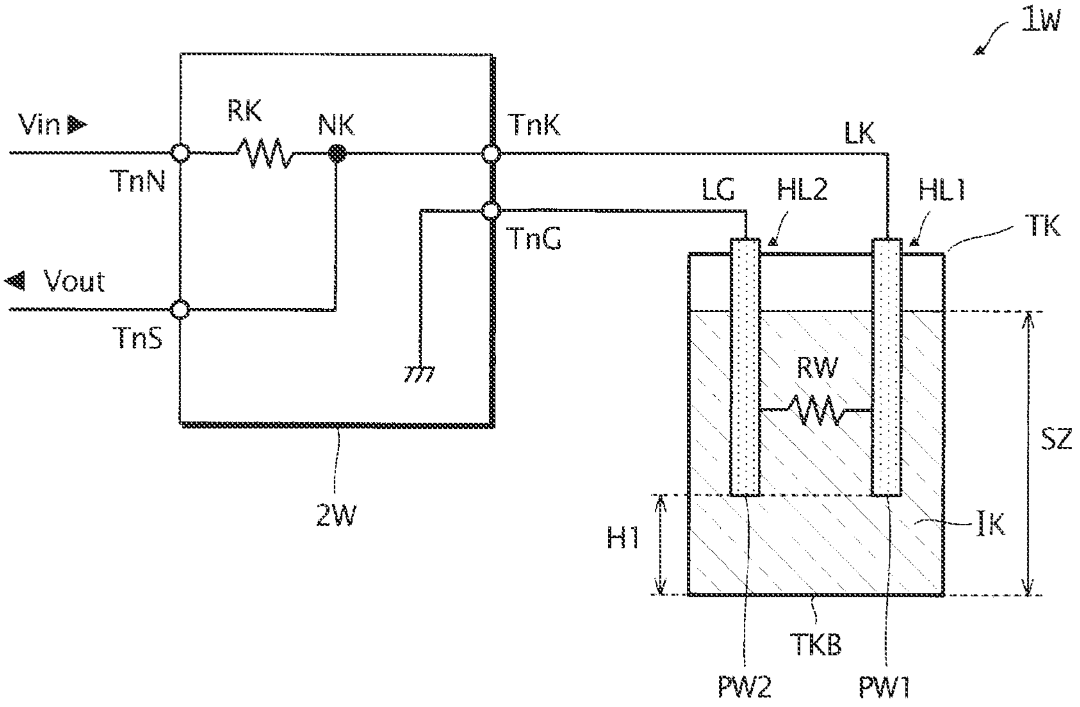
FIG. 6 is a circuit diagram of an ink storage apparatus according to a comparative example.

As illustrated in FIG. 6, the ink storage apparatus 1W according to the comparative example is different from the ink storage apparatus 1 according to the embodiment in that it includes: an electrode bar PW1 and an electrode bar PW2 arranged inside an ink tank TK[m] instead of the electrode bar PG; and a ink amount detection circuit 2W instead of the ink amount detection circuit 2.

The electrode bar PW1 is a cylindrical electrode that is disposed inside the ink tank TK[m] and extends in the direction Z1. In the comparative example, the electrode bar PW1 is fixed to the ink tank TK[m] while inserted into a mounting hole HL1, with the distance in the Z-axial direction between the end of the electrode bar PW1 on the direction Z1 side and a bottom TKB of the ink tank TK[m] being set to a distance H1. Likewise, the electrode bar PW2 is a cylindrical electrode that is disposed inside the ink tank TK[m] and extends in the direction Z1. In the comparative example, the electrode bar PW2 is fixed to the ink tank TK[m] while inserted into a mounting hole HL2, with the distance in the Z-axial direction between the end of the electrode bar PW2 on the direction Z1 side and the bottom TKB of the ink tank TK[m] being set to the distance H1.

In the comparative example, when an ink liquid surface distance SZ is the same as or longer than the distance H1, both the electrode bars PW1 and PW2 are in contact with ink IK contained in the ink tank TK[m]. In other words, when the ink liquid surface distance SZ is the same as or longer than the distance H1, both the electrode bars PW1 and PW2 are electrically coupled together through the ink IK contained in the ink tank TK[m]. Hereinafter, when both the electrode bars PW1 and PW2 are in contact with the ink IK contained in the ink tank TK[m], a resistance of the ink IK via which the electrode bars PW1 and PW2 are electrically coupled together is referred to as a resistance RW. When one or both of the electrode bars PW1 and PW2 are not in contact with the ink IK, the resistance between the electrode bars PW1 and PW2 has a very high value. In the comparative example, when one or both of the electrode bars PW1 and PW2 are not in contact with the ink IK, the ink resistance RW may be regarded as having a very high value.

The ink amount detection circuit 2W is different from the ink amount detection circuit 2 according to the embodiment in that it includes a detection terminal TnK instead of both the detection terminals TnK1 and Tnk2 and does not include both the switch SWK and the control terminal TnC In the comparative example, the detection terminal TnK is electrically coupled to the electrode bar PW1 via a wire LK. In the comparative example, the detection terminal TnK is also electrically coupled to a node NK. In the comparative example, a reference potential connection terminal TnG is electrically coupled to the electrode bar PW2 via a wire LG. In the comparative example, when the ink liquid surface distance SZ is equal to or longer than the distance H1, the electrode bars PW1 and PW2 are electrically coupled together via the ink IK contained in the ink tank TK[m]. In the comparative example, the potential at the node NK depends on an input potential V0 of the input signal Vin, a resistance value of the ink resistance RW, and a resistance value of the resistance RK. In the comparative example, when the ink liquid surface distance SZ is shorter than the distance H1, the ink resistance RW has a very high value. In the comparative example, the potential at the node NK is thus substantially the same as the input potential V0 of the input signal Vin.

When the ink liquid surface distance SZ is shorter than the distance H1, the potential at the node NK in the ink amount detection circuit 2W is higher than that when the ink liquid surface distance SZ is the same as or longer than the distance H1. In this case, the ink amount detection circuit 2W outputs, via an output terminal TnS, a detection signal Vout indicating the potential at the node NK.

Similar to an ink storage apparatus 1 according to an embodiment, as described above, the ink storage apparatus 1W according to the comparative example can detect whether the remaining amount of ink IK contained in an ink tank TK[m] is the same as or larger than the ink remaining amount for the distance H1. The ink storage apparatus 1W according to the comparative example, however, may be unable to detect whether the remaining amount of ink IK contained in the ink tank TK[m] is the same as or larger than the ink remaining amount for the distance H2. In contrast, the ink storage apparatus 1 according to this embodiment can detect whether the remaining amount of ink IK contained in an ink tank TK[m] is the same as or larger than the ink remaining amount for the distance H2.

The ink storage apparatus 1W according to the comparative example includes an electrode bar PW1 and an electrode bar PW2 inside an ink tank TK[m]. The comparative example thus involves forming two mounting holes, or a mounting hole HL1 and a mounting hole HL2, in an ink tank TK[m]. In addition, the comparative example involves installing the electrode bars PW1 and PW2 inside the ink tank TK[m]. In contrast, the ink storage apparatus 1 according to this embodiment includes a single electrode bar PG inside the ink tank TK[m]. In the embodiment, it is thus only necessary to form a single mounting hole HL in the ink tank TK[m]. In the embodiment, it is also only necessary to install a single electrode bar PG inside the ink tank TK[m]. With the embodiment, the ink storage apparatus 1 can be manufactured with a little time and effort compared to the comparative example.

A-4. Conclusion of Embodiment

As described above, an ink jet printer 100 according to an embodiment of the present disclosure includes: an ink tank TK[m] that contains ink IK having conductivity; an electrode bar PG that is disposed inside the ink tank TK[m] and that includes a reference terminal DG, a detection terminal D1, and an insulating portion B1 that electrically insulates the reference terminal DG from the detection terminal D1; an ink amount detection circuit 2 that detects a remaining amount of ink IK contained in the ink tank TK in accordance with an electrical signal from at least one of the reference terminal DG and the detection terminal D1; and a liquid ejection head HU[m] that discharges the ink IK supplied from the ink tank TK[m]. The remaining amount of ink IK detected by the ink amount detection circuit 2 when the reference terminal DG is electrically coupled to the detection terminal D1 via the ink IK in the ink tank TK[m] is larger than the remaining amount of ink IK detected by the ink amount detection circuit 2 when the reference terminal DG is not electrically coupled to the detection terminal D1 via the ink IK in the ink tank TK[m]. In this embodiment, the reference terminal DG corresponds to an example of a first terminal; the detection terminal D1 corresponds to an example of a second terminal; and the insulating portion B1 corresponds to an example of a first insulating section.

According to this embodiment, the remaining amount of ink IK contained in an ink tank TK[m] is detected with a single electrode bar PG disposed inside the ink tank TK. With the embodiment, the ink jet printer 100 can be manufactured with a little time and effort, for example, compared to an aspect, such as the above comparative example, in which a remaining amount of ink IK contained in an ink tank TK[m] is detected with two electrodes, or an electrode bar PW1 and an electrode bar PW2, arranged inside the ink tank TK[m].

In the ink jet printer 100 according to this embodiment, when the electrode bar PG is viewed from a direction Z1, the reference terminal DG may have an outer circumference GDG that surrounds a central area GM centered on a central axis AX of the electrode bar PG, the detection terminal D1 may have an outer circumference GD1 that surrounds the central area GM, and the insulating portion B1 may have an outer circumference GB1 that surrounds the central area GM. In this embodiment, the outer circumference GDG corresponds to an example of a first outer circumference; the outer circumference GD1 corresponds to an example of a second outer circumference; and the outer circumference GB1 corresponds to an example of a third outer circumference.

In the ink jet printer 100 according to this embodiment, the electrode bar PG may further include: a detection terminal D2; and an insulating portion B2 that electrically insulates the detection terminal D1 from the detection terminal D2. When the electrode bar PG is viewed from the direction Z1, the detection terminal D2 may have an outer circumference GD2 that surrounds the central area GM, and the insulating portion B2 may have an outer circumference GB2 that surrounds the central area GM. In this embodiment, the detection terminal D2 corresponds to an example of a third terminal; the insulating portion B2 corresponds to an example of a second insulating section; the outer circumference GD2 corresponds to an example of a fourth outer circumference; and the outer circumference GB2 corresponds to an example of a fifth outer circumference.

According to this embodiment, the ink amount detection circuit 2 can detect the remaining amount of ink IK contained in the ink tank TK[m], depending on whether the reference terminal DG is electrically coupled to the detection terminal D1 via the ink IK. Moreover, the ink amount detection circuit 2 can detect the remaining amount of ink IK contained in the ink tank TK[m], depending on whether the reference terminal DG is electrically coupled to the detection terminal D2 via the ink IK. According to this embodiment, the ink amount detection circuit 2 can detect the remaining amount of ink IK contained in the ink tank TK[m] at least at three levels.

In the ink jet printer 100 according to this embodiment, the electrode bar PG may include a plurality of terminals including the reference terminal DG and the detection terminal D1. The ink amount detection circuit 2 may detect the remaining amount of ink IK contained in the ink tank TK[m] in accordance with an electrical signal from at least one of the reference terminal DG, which is an innermost one among the plurality of terminals when the electrode bar PG is viewed from the direction Z1, and a terminal other than the reference terminal DG among the plurality of terminals.

According to this embodiment, the reference terminal DG, which is the innermost one among the plurality of terminals, is used to detect the remaining amount of ink IK contained in the ink tank TK[m]. This configuration can detect a small amount of ink IK compared to an aspect in which the remaining amount of ink IK contained in an ink tank TK[m] is detected without a reference terminal DG, which is an innermost one among a plurality of terminals.

In the ink jet printer 100 according to this embodiment, the electrode bar PG may be a phone plug.

According to this embodiment, a commercial or mass-produced product can be used as the electrode bar PG. Therefore, the electrode bar PG is easily available at a low cost.

B. Modification

Embodiments as described above may be modified in various ways. Some aspects of such modifications will be described below. Of the aspects described below, two or more may be selected and combined together as appropriate unless they are contradictory to one another.

B-1. Modification 1

Although an ink storage apparatus 1 includes one or more ink amount detection circuits 2 in the foregoing embodiment, the present disclosure is not limited to such aspects. Alternatively, the ink storage apparatus 1 may include any ink amount detection circuit that can detect the remaining amount of ink IK contained in an ink tank TK[m] in accordance with an electrical signal from an electrode bar PG disposed inside the ink tank TK[m].

Figure 7:
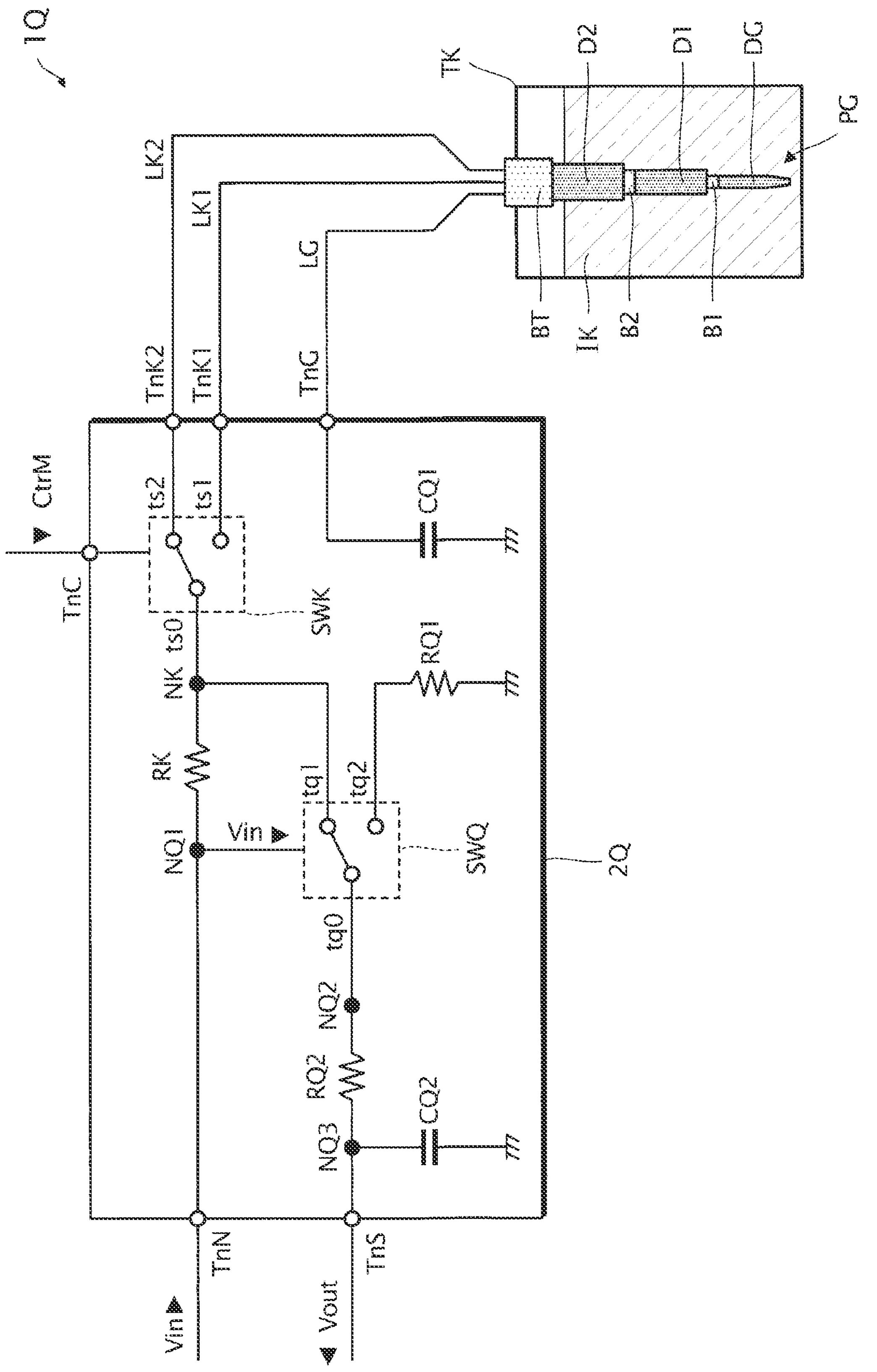
FIG. 7 is a circuit diagram of an ink storage apparatus according to a modification of the embodiment.

FIG. 7 is a circuit diagram of an ink storage apparatus 1Q mounted in an ink jet printer according to modification 1. The ink jet printer according to modification 1 is different from the ink jet printer 100 according to the embodiment in that it includes the ink storage apparatus 1Q instead of the ink storage apparatus 1. The ink storage apparatus 1Q is different from the ink storage apparatus 1 according to the embodiment in that it includes an ink amount detection circuit 2Q instead of the ink amount detection circuit 2.

As illustrated in FIG. 7, the ink amount detection circuit 2Q is similar to the ink amount detection circuit 2 according to the embodiment in that it includes an input terminal TnN, a detection terminal TnK1, a detection terminal TnK2, a reference potential connection terminal TnG, an output terminal TnS, a control terminal TnC, a switch SWK, a node NK, and a resistance RK. However, the ink amount detection circuit 2Q is different from the ink amount detection circuit 2 in that it includes a node NQ1, a node NQ2, a node NQ3, a resistance RQ1, a resistance RQ2, a capacity CQ1, a capacity CQ2, and a switch SWQ.

The node NQ1 is electrically coupled to the input terminal TnN and is supplied with an input signal Vin via the input terminal TnN. The resistance RK has a first end electrically coupled to the node NK and a second end electrically coupled to the node NQ1. The capacity CQ1 has a first electrode electrically coupled to the reference potential connection terminal TnG and a second electrode electrically coupled to the ground via a ground wire.

The switch SWQ includes an input terminal tq1, an input terminal tq2, an output terminal tq0, and a control terminal (not illustrated). The input terminal tq1 is electrically coupled to the node NK; the input terminal tq2 is electrically coupled to a first end of the resistance RQ1; and the output terminal tq0 is electrically coupled to the node NQ2. The control terminal of the switch SWQ is supplied with the input signal Vin via the node NQ1.

In this modification, the input signal Vin is set to one of a high level and a low level. In the modification, when the input signal Vin supplied to the control terminal of the switch SWQ via the node NQ1 is at the low level, the switch SWQ electrically couples the output terminal tq0 to the input terminal tq1. In other words, in the modification, when the input signal Vin supplied to the control terminal of switch SWQ via the node NQ1 is at the low level, the switch SWQ electrically couples the node NK to the node NQ2. In the modification, when the input signal Vin supplied to the control terminal of switch SWQ via the node NQ1 is at the high level, the switch SWQ electrically couples the output terminal tq0 to the input terminal tq2. In other words, in the modification, when the input signal Vin supplied to the control terminal of switch SWQ via the node NQ1 is at the high level, the switch SWQ electrically couples the first end of the resistance RQ1 to the node NQ2.

The resistance RQ1 has the first end electrically coupled to the input terminal tq2 and a second end electrically coupled to the ground via a ground wire. The resistance RQ2 has a first end electrically coupled to the node NQ2 and a second end electrically coupled to the node NQ3. The capacity CQ2 has a first electrode electrically coupled to the node NQ3 and a second electrode electrically coupled to the ground via a ground wire. In this case, the combination of the resistance RQ2 and the capacity CQ2 constitutes a low-pass filter. The output terminal TnS is electrically coupled to the node NQ3. Via the output terminal TnS, a detection signal Vout having the same potential as that at the node NQ3 is output.

Figure 8:
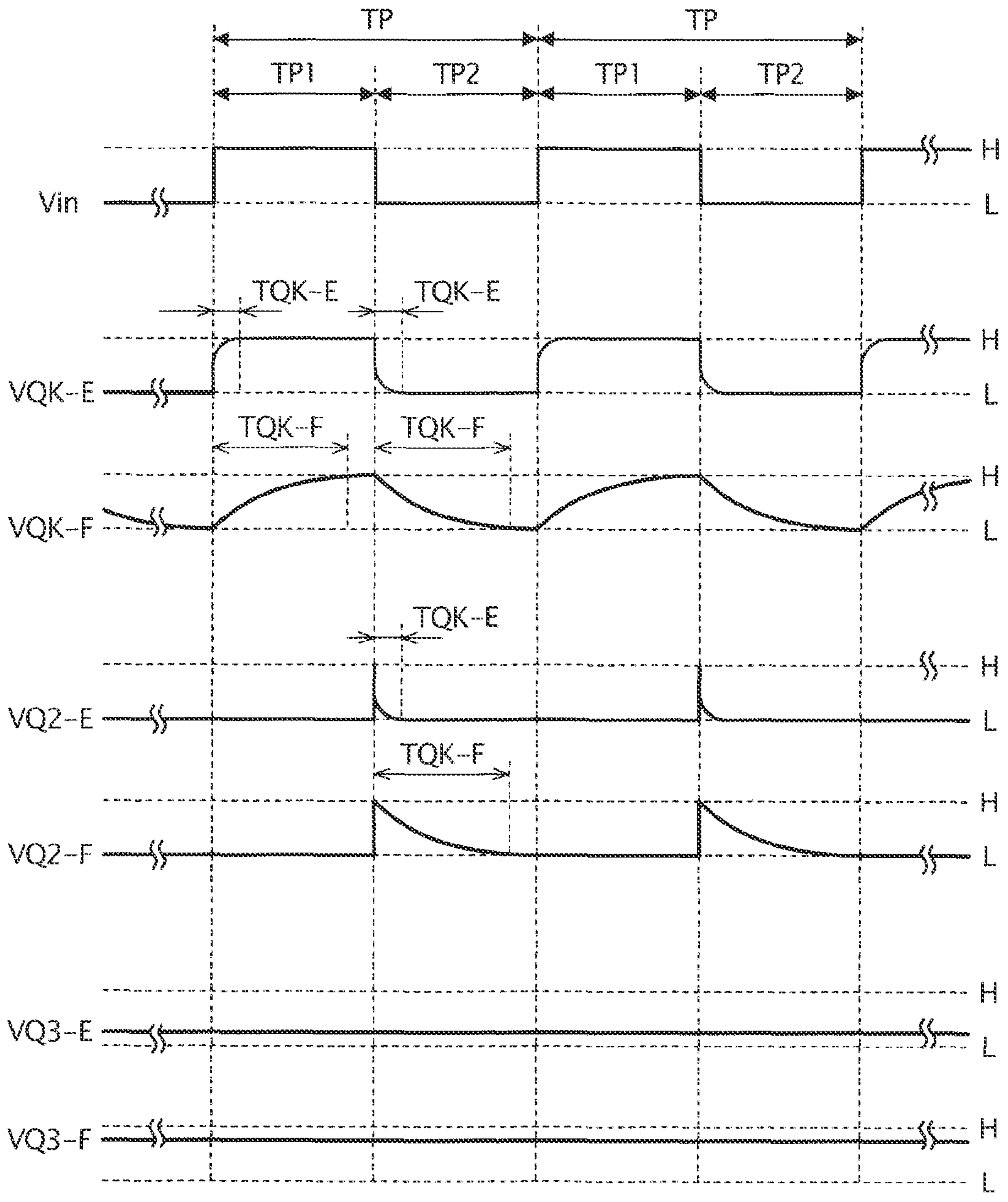
FIG. 8 is a timing chart of signals transmitted in the ink storage apparatus according to the modification.

FIG. 8 is a timing chart of various signals transmitted in the ink amount detection circuit 2Q.

In this modification, as illustrated in FIG. 8, the operational period of the ink amount detection circuit 2Q is divided into a plurality of unit periods TP. In the modification, each unit period TP is further divided into a control period TP1 and a control period TP2.

The input signal Vin is kept at the high level over the control period TP1 within the unit period TP and also at the low level over the control period TP2 within the unit period TP.

A signal VQK indicates the potential at the node NK. Hereinafter, when the ink amount detection circuit 2Q operates in the ink-end detection mode with the ink liquid surface distance SZ being shorter than the distance H1 in an ink tank TK[m] or when the ink amount detection circuit 2Q operates in the near-end detection mode with the ink liquid surface distance SZ being shorter than the distance H2 in the ink tank TK[m], the signal VQK is referred to as a signal VQK-E. Hereinafter, when the ink amount detection circuit 2Q operates in the ink-end detection mode with the ink liquid surface distance SZ being shorter than the distance H1 in the ink tank TK[m], namely, with the reference terminal DG being not electrically coupled to the detection terminal D1 or when the ink amount detection circuit 2Q operates in the near-end detection mode with the ink liquid surface distance SZ being shorter than the distance H2 in the ink tank TK[m], namely, with the reference terminal DG being not electrically coupled to the detection terminal D2, this state is referred to as an ink insulation state. Hereinafter, when the ink amount detection circuit 2Q operates in the ink-end detection mode with the ink liquid surface distance SZ being the same as or longer than the distance H1 in the ink tank TK[m] or when the ink amount detection circuit 2Q operates in the near-end detection mode with the ink liquid surface distance SZ being the same as or longer than the distance H2 in the ink tank TK[m], the signal VQK is referred to as a signal VQK-F. Hereinafter, when the ink amount detection circuit 2Q operates in the ink-end detection mode with the ink liquid surface distance SZ being the same as or longer than the distance H1 in the ink tank TK[m], namely, with a reference terminal DG being electrically coupled to the detection terminal D1 or when the ink amount detection circuit 2Q operates in the near-end detection mode with the ink liquid surface distance SZ being the same as or longer than the distance H2 in the ink tank TK[m], namely, with the reference terminal DG being electrically coupled to the detection terminal D2, this state is referred to as an ink conduction state.

In the ink insulation state, the reference terminal DG is neither electrically coupled to the detection terminal D1 nor the detection terminal D2. In this case, the waveform of the signal VQK-E is in step with that of the input signal Vin. More specifically, the signal VQK-E rises from the low level to the high level after a delay of a time TQK-E has passed from the timing at which the input signal Vin rises from the low level to the high level, whereas the signal VQK-E falls from the high level to the low level after the delay of the time TQK-E has passed from the timing at which the input signal Vin falls from the high level to the low level. Each time TQK-E is a period shorter than each control period TP1 and also shorter than each control period TP2 and corresponds to a period required to charge the capacity parasitizing in conductive materials electrically coupled to the node NK, such as a wire LK1 and a detection terminal D1 or a wire LK2 and a detection terminal D2.

In the ink conduction state, the reference terminal DG is electrically coupled to either the detection terminal D1 or the detection terminal D2. In this case, the waveform of the signal VQK-F is more rounded than that of the input signal Vin. More specifically, the signal VQK-F rises from the low level to the high level after a delay of a time TQK-F has passed from the timing at which the input signal Vin rises from the low level to the high level, whereas the signal VQK-F falls from the high level to the low level after the delay of the time TQK-F has passed from the timing at which the input signal Vin falls from the high level to the low level. Each time TQK-F is a period longer than each delay time TQK-E and corresponds to a period required to charge the capacity CQ1 in addition to the capacity parasitizing in conductive materials electrically coupled to the node NK, such as the wire LK1 and the detection terminal D1 or the wire LK2 and the detection terminal D2.

A signal VQ2 indicates the potential at the node NQ2. Hereinafter, the signal VQ2 in the ink insulation state is referred to as a signal VQ2-E, whereas the signal VQ2 in the ink conduction state is referred to as a signal VQ2-F.

Over the control period TP1 in which the input signal Vin is kept at the high level, as described above, the switch SWQ continues to electrically couple the node NQ2 to the first end of the resistance RQ1. Over the control period TP1, the signal VQ2 is kept at the low level accordingly.

Over the control period TP2 in which the input signal Vin is kept at the low level, the switch SWQ continues to electrically couple the node NQ2 to the first end of the node NK. In the ink insulation state, the signal VQ2-E takes a time TQK-E to make its waveform fall from the high level to the low level within the control period TP2. Likewise, in the ink conduction state, the signal VQ2-F takes a time TQK-F to make its waveform fall from the high level to the low level within the control period TP2.

A signal VQ3 indicates the potential at the node NQ3. Hereinafter, the signal VQ3 in the ink insulation state is referred to as a signal VQ3-E, whereas the signal VQ3 in the ink conduction state is referred to as a signal VQ3-F.

As described above, the combination of the resistance RQ2 and the capacity CQ2 constitutes a low-pass filter. The waveform of the signal VQ3 is generated by removing a high-frequency component from the signal VQ2. Since the time TQK-F is longer than the time TQK-E, as described above, the potential of the signal VQ3-F is higher than that of the signal VQ3-E. In this modification, the potential of the detection signal Vout output from the ink amount detection circuit 2Q in the ink conduction state is higher than that in the ink insulation state.

B-2. Modification 2

As described above, each of the ink storage apparatus 1 according to the embodiment and the ink storage apparatus 1Q according to modification 1 includes: an M number of ink tanks, or ink tanks TK[1] to TK[M]; and an M number of ink amount detection circuits related on a one-to-one basis to the ink tanks TK[1] to TK[M]. However, the present disclosure is not limited to such aspects. Alternatively, the ink storage apparatus 1 may include an (M−1) number of ink amount detection circuits 2, and/or the ink storage apparatus 2Q may include an (M−1) number of ink amount detection circuits 2Q.

The ink storage apparatus 1 may include a single ink amount detection circuit 2. In this case, the operational period of the ink amount detection circuit 2 may be divided into an M number of unit operational periods. In addition, the ink amount detection circuit 2 may detect the remaining amount of ink IK contained in an ink tank TK[m] in an m-th unit operational period. More specifically, the ink amount detection circuit 2 may switch the ink tank TK[m] to which the ink amount detection circuit 2 is electrically coupled, for each unit operational period.

B-3. Modification 3

In each of an ink amount detection circuit 2 according to the embodiment and an ink amount detection circuit 2Q according to modifications 1 and 2, a node NK is selectively electrically coupled to a detection terminal D1 via a wire LK1 and a detection terminal D2 via a wire LK2. In addition, a reference potential connection terminal TnG is electrically coupled to a reference terminal DG via a wire LG. However, the present disclosure is not limited to such aspects. Alternatively, in each of the ink amount detection circuits 2 and 2Q, the node NK may be electrically coupled to the reference terminal DG via the wire LG. In addition, the reference potential connection terminal TnG is selectively electrically coupled to the detection terminal D1 via the wire LK1 and the detection terminal D2 via the wire LK2.

B-4. Modification 4

An ink jet printer 100 according to each of the embodiment and modifications 1 to 3 is a serial type of ink jet printer that moves a casing 921 that accommodates liquid ejection heads HU[m] in main-scanning directions MH1 and MH2. However, the present disclosure is not limited to such aspects. Alternatively, the ink jet printer 100 according to each of the embodiment and modifications 1 to 2 may be a line type of liquid ejecting apparatus that includes liquid ejection heads HU[m] configured to discharge ink IK over a surface of a medium PP at one time.

B-5. Modification 5

A liquid ejecting apparatus implemented by the ink jet printer 100 according to each of the embodiment and modifications 1 to 4 may be applied to apparatuses dedicated to printing as well as facsimile machines, copy machines, and other apparatuses. There are, however, no limitations on applications of the liquid ejecting apparatus. As an example, the liquid ejecting apparatus is modified to discharge liquids containing color materials and applied to apparatuses that manufacture color filters to be mounted in liquid crystal devices. As another example, the liquid ejecting apparatus is modified to discharge a liquid containing a conductive material and applied to apparatuses that manufacture wires and electrodes to be mounted on interconnection substrates.

What is claimed is:

1. A liquid ejecting apparatus comprising:

a container that contains a liquid having conductivity;

an electrode bar disposed inside the container, the electrode bar including a first terminal, a second terminal, and a first insulating section that electrically insulates the first terminal from the second terminal;

a detection section that detects a remaining amount of liquid contained in the container in accordance with an electrical signal from at least one of the first terminal and the second terminal; and a liquid ejection head that discharges the liquid supplied from the container, wherein when the electrode bar is viewed from an extension direction of the electrode bar, the first terminal has a first outer circumference that surrounds a central area centered on a central axis of the electrode bar, the second terminal has a second outer circumference that surrounds the central area, and the first insulating section has a third outer circumference that surrounds the central area, and the remaining amount of liquid detected by the detection section when the first terminal is electrically coupled to the second terminal via the liquid in the container is larger than the remaining amount of liquid detected by the detection section when the first terminal is not electrically coupled to the second terminal via the liquid in the container.

2. The liquid ejecting apparatus according to claim 1, wherein the electrode bar further includes a third terminal and a second insulating section that electrically insulates the second terminal from the third terminal, and when the electrode bar is viewed from the extension direction of the electrode bar, the third terminal has a fourth outer circumference that surrounds the central area, and the second insulating section has a fifth outer circumference that surrounds the central area.

3. The liquid ejecting apparatus according to claim 1, wherein the electrode bar has a plurality of terminals including the first terminal and the second terminal, and the detection section detects the remaining amount of liquid contained in the container in accordance with an electrical signal from at least one of an innermost terminal among the plurality of terminals when the electrode bar is viewed from the extension direction of the electrode bar and a terminal other than the innermost terminal among the plurality of terminals.

4. The liquid ejecting apparatus according to claim 1, wherein the electrode bar is a phone plug.

5. A liquid storage apparatus comprising:

a container that contains a liquid having conductivity;

an electrode bar disposed inside the container, the electrode bar including a first terminal, a second terminal, and a first insulating section that electrically insulates the first terminal from the second terminal; and a detection section that detects a remaining amount of liquid contained in the container in accordance with an electrical signal from at least one of the first terminal and the second terminal, wherein when the electrode bar is viewed from an extension direction of the electrode bar, the first terminal has a first outer circumference that surrounds a central area centered on a central axis of the electrode bar, the second terminal has a second outer circumference that surrounds the central area, and the first insulating section has a third outer circumference that surrounds the central area, and the remaining amount of liquid detected by the detection section when the first terminal is electrically coupled to the second terminal via the liquid in the container is larger than the remaining amount of liquid detected by the detection section when the first terminal is not electrically coupled to the second terminal via the liquid in the container.

6. The liquid storage apparatus according to claim 5, wherein the electrode bar further includes a third terminal and a second insulating section that electrically insulates the second terminal from the third terminal, and when the electrode bar is viewed from the extension direction of the electrode bar, the third terminal has a fourth outer circumference that surrounds the central area, and the second insulating section has a fifth outer circumference that surrounds the central area.

7. The liquid storage apparatus according to claim 5, wherein the electrode bar has a plurality of terminals including the first terminal and the second terminal, and the detection section detects the remaining amount of liquid contained in the container in accordance with an electrical signal from at least one of an innermost terminal among the plurality of terminals when the electrode bar is viewed from the extension direction of the electrode bar and a terminal other than the innermost terminal among the plurality of terminals.

8. The liquid storage apparatus according to claim 5, wherein the electrode bar is a phone plug.

* * * * *